Jan. 21, 1969  E. B. NICHOLS  3,423,292

APPARATUS FOR MAKING RESINOUS SOLUTIONS

Original Filed Jan. 18, 1963

INVENTOR.
EDGAR B. NICHOLS
BY
ATTORNEY

United States Patent Office 3,423,292
Patented Jan. 21, 1969

3,423,292
APPARATUS FOR MAKING RESINOUS SOLUTIONS
Edgar B. Nichols, 325 W. Main St.,
Moorestown, N.J. 08057
Continuation of application Ser. No. 252,351, Jan. 18, 1963. This application June 9, 1967, Ser. No. 645,577
U.S. Cl. 202—169    3 Claims
Int. Cl. B01d 11/02

ABSTRACT OF THE DISCLOSURE

An apparatus for making plastic resinous solutions including an outer vessel and an inner container, mounted within the vessel, for holding an amount of solvent. A perforated basked is arranged within the inner container to retain resinous particles and a vertical reflux container is supported above the vessel to condense any vapors back into the container.

---

This application is a continuation of my prior application Ser. No. 252,351, filed Jan. 18, 1963.

In my copending application Ser. No. 606,971, filed Aug. 20, 1956, now abandoned, I have disclosed a coating composition consisting essentially of a solution of nylon in methanol or other suitable volatile solvent. This application relates to improved methods and apparatus for making compositions of the character described in the above-noted application and forming films of such compositions.

Figure 1:
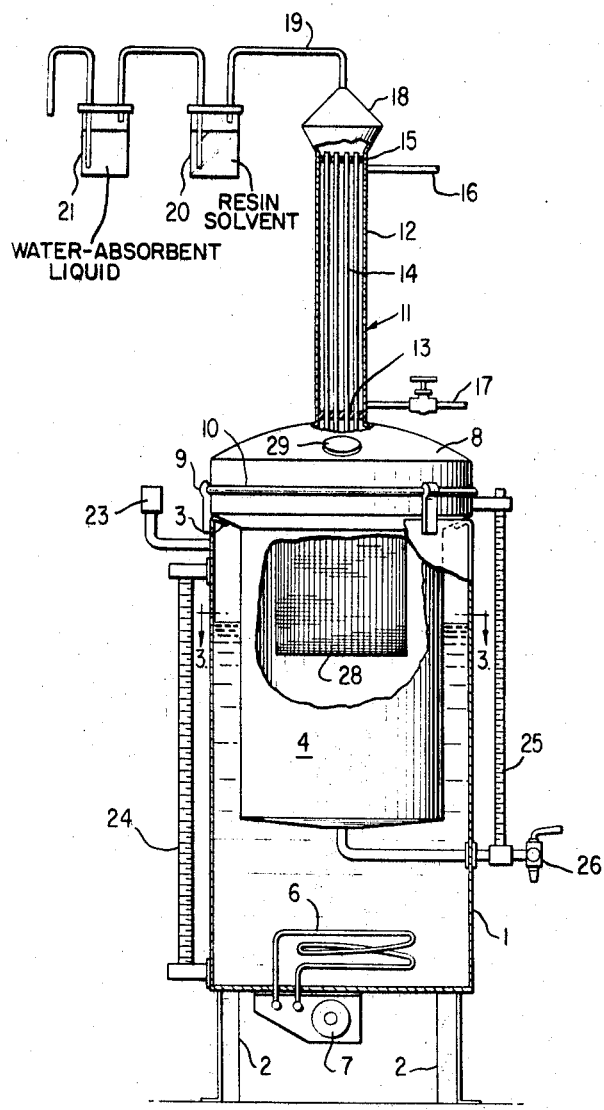
Figure 2:
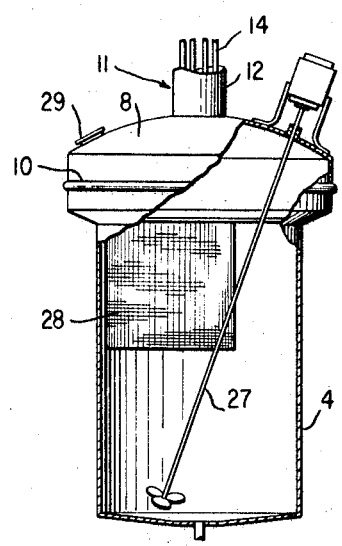
Figure 3:
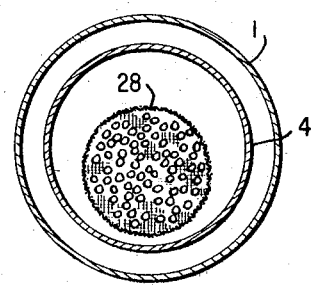

In the accompanying drawings, I have shown a preferred form of my improved apparatus for making my film forming composition and in the said drawings:

FIG. 1 is a side elevation partly broken away;
FIG. 2 is a vertical section on line 2—2 of FIG. 1; and
FIG. 3 is a horizontal section on line 3—3 of FIG. 1.

In the said drawings, 1 indicates the outer shell of the apparatus. It is, as shown, a cylindrical vessel resting at one end on a supporting frame 2. The upper end of the shell is open and formed with an internal flange 3 for supporting the inner vessel 4, which is also a cylindrical vessel but smaller in both height and diameter than the outer vessel 1. The inner vessel 3 is enlarged at its upper end, as shown, forming a shoulder which rests on the flange 3. The two vessels form a double boiler which is heated by a submerged electric heater 6 equipped with an adjustable thermostatic control 7 by means of which the water in the outer vessel may be kept at any desired temperature. The inner vessel is provided with a cover 8 fitted tightly to the open end of the vessel by means of clamps 9 and a gasket 10.

Mounted on the cover 8 is a reflux condenser 11 consisting of a shell 12 closed at its lower end by a header 13 in which a number of vertical tubes 14 are seated. The upper end of the shell 12 is closed by a header 15, in which the upper ends of the tubes are fitted. Pipes 16 and 17 are connected to the shell 12 at its upper and lower ends, respectively, for the circulation of cooling water. A vapor dome 18 is mounted on the shell 12 above the upper header 15 and attached to the vent of the vapor dome is a pipe 19 leading to a wash bottle 20 which in turn is connected to a second wash bottle 21, whose intake pipe is open to the air. The primary purpose of the wash bottle is to permit the entrance of water-free air to the second container as may be necessary to maintain atmospheric pressure in the second container and the condenser tubes, as will be later described.

The outer container is provided with a spring-loaded relief valve 23 and a water level glass 24. The inner vessel also has a liquid level glass 25 and a drain-off valve 26. The inner vessel is also equipped with an electric stirrer 27.

Mounted in the inner container is a cylindrical basket 28 of wire mesh. The basket is suspended from the cover, or the upper enlarged part of the container, in a position beneath the reflux condenser and with its bottom wall somewhat above the middle of the container. The cover 8 of the inner container has an opening over the wire basket, which opening is normally closed by a removable glass panel 29.

In operation, the nylon, preferably in the form of pellets or granules is poured into the basket through the opening 29. The inner container is then filled with anhydrous methanol to a level about midway the height of the basket. A small quantity of phenol may be added to the methanol. The outer vessel is kept filled with water to the level shown and the thermostat of the heater 6 is set to maintain a temperature above the atmospheric boiling point of the methanol-phenol mixture, but not high enough to overload the condenser 11. The stirrer 27 is set at an angle to the bottom of the vessel so as to maintain a circulation of the boiling methanol toward the side of the vessel and thence upward through nylon granules in the basket 28.

The wash bottle 20 is partially filled with methanol and the wash bottle 21 is partially filled with a water absorbent material such as calcium chloride. The wash bottle assembly maintains the pressure in the container 4 at the surrounding atmospheric pressure plus or minus the pressure equivalent of the hydrostatic head of the liquid in the wash bottles. When the pressure falls below this minimum, water-free air will be drawn in through the vapor dome.

The boiling-refluxing operation is maintained until all the nylon is dissolved. The time required depends primarily on the solubility of the nylon, which varies considerably, and the concentration of the solution. Concentrations as high as 25% nylon by weight have been made and for most purposes it is advantageous to make the solution as concentrated as may be consistent with the production of a solution which after an extended shelf storage will on heating again become a homogeneous, freely pouring liquid.

By using a reflux condenser of ample capacity, there is no loss of methanol during the boiling cycle and consequently the concentration of the soluion, i.e., the ratio of nylon to solvent is exactly known without analysis or other test. Hence, solution of any desired lesser concentration can be accurately and instantly obtained by adding to the solution initially produced the quantity of methanol necessary to obtain the desired lower ratio of nylon and solvent.

To make a clear solution containing 20% nylon by weight, a mixture of anhydrous methanol, 30 parts by weight, and phenol, .3 part by weight, is placed in the container 4 and nylon pellets, 6 parts by weight, are dropped into the wire basket 28 through the opening 29. The thermostat 7 is set at 190° F. The flow of cooling water is adjusted so that there will be no buildup of pressure in the vessel from the solvent mixture which has a boiling point of approximately 160° F. About 90 minutes is required for a complete cycle from room temperature water in the outer vessel to a solution with the nylon fully dissolved and cooled sufficiently for withdrawal and storage. The boiling solution will be quickly condensed upon drawing-off the water from the outer vessel and the cycle will be somewhat shortened if the outer vessel is initially filled with preheated water. Also, if desired, the outer vessel may be provided with hot and cold water connections so that the container can be filled with cold water at the end of the boiling cycle and with preheated hot water at the beginning of the cycle.

The clear solution made as described above can be used for applying transparent coating to surfaces of all kinds. The solution can be applied by dipping, spraying, brushing, or in any other manner used for liquid coating compositions. It can be diluted to any desired concentration by the addition of methanol or a methanol-phenol mixture. The applied coating dries rapidly and a second coating can be applied almost immediately. Coatings of any desired thickness can be built up by successive applications and such coatings are of uniform and exact thickness, depending on the concentration of the solution and the mode of application, and without lamination.

The clear solution may also be used for making transparent, self-sustaining films of any desired thickness from two ten thousandths of an inch up, by pouring the solution on a smooth surface of glass, polished metal, or other suitable material. A film of the above thickness can be made by pouring a solution containing 10% nylon on a plate glass surface at room temperature. Thicker films can be made by using more concentrated solutions, or by repeated applications to the same area. Continuous films can be made by applying the solution to the surface of a moving drum or belt.

My nylon film forming solution is of particular value in making films, both coating films and self-sustaining films, of varied colors and textures. I have found that many of the pigments and dyes used in paints and colors for yarns and textiles can be used in my film forming solution by merely incorporating the pigment or dye, in the form in which it is marketed for its present uses, in the methanol used for diluting the solution to the proper concentration for the formation of the desired film. I have also discovered that the wide variations in the appearance and surface texture of pigmented films made with my nylon film forming solutions can be obtained by varying the relative proportions of nylon and pigment in the solution, the concentration of the solution, the rate of solvent evaporations, and other factors of the film forming process.

To make a white coating one part by weight of pure titanium oxide ($TiO_2$) finely ground is added to a mixture of 30 parts methanol and .3 part phenol and 6 parts of nylon are dissolved therein by the procedure followed in making the clear solution, as described above. The coating composition so made can be stored indefinitely in hermetically sealed containers and when so stored, the pigment does not settle out in a cohesive layer, and the composition is ready for use at any time without prolonged agitation. For most purposes, the concentration of the solution is reduced by the addition of methanol. For coating bowling pins by successive dipping, a 10% nylon solution has been found most suitable. Five dippings in a 10% solution at room temperature will form a uniform coating .015 inch thick on the surface of the pin, which is smooth, highly resistant to damage by the impact of the bowling balls and insures long life to the pin with much less pickup of dirt than pins painted and shellacked or varnished in the customary manner. For coatings to be applied by spraying or brushing, lower concentrations may be advantageously used. Coatings so applied are strongly adherent to surfaces of wood, metal, plastic, paper, textile fabrics, etc., have excellent wear and better resistance, and for both outside protection or interior decoration require less frequent renewal than coatings of present day commercial paint.

For casting self-sustaining films by pouring the composition on a glass or metal casting surface, the full strength solution may be employed, particularly if the film is to be used for making artists' colors, as described in my copending application, filed concurrently herewith.

To make colored solutions, 10 parts by weight of methanol is added to 10 parts of the clear solution made as above described, but with a solid content of 10%. To this mixture is added 0.3 part by weight of a pigment such as "Monestral red Y" ground to a slurry in a small quantity of nylon solution.

This solution, when poured on a horizontal glass or polished metal surface at room temperature and allowed to dry, forms a film .006 inch thick with a grain-like surface texture closely resembling Morocco leather. If the mixture is made with clear solution having only 5% solid content, the film will be much thinner and the "grain" will be much smoother. If a clear solution of only 3% solid content is used and with the quantity of pigment also reduced, the film will be in the order of .005 inch thick and will be smooth, without grain. The film, on drying, strips readily from the casting surface.

If a thinner film with the same grain as the 10% solid content mixture produces when allowed to spread of its own fluidity is desired, the quantity of mixture per unit of area of the casting surface can be reduced by moving the casting surface at a faster rate away from the feed nozzle supplying the solution to be cast. For example, in the film forming machine described in my copending application filed concurrently herewith, the casting surface is a metal belt and the thickness of the film can be varied by either changing the speed of the belt or the rate of flow of the solution onto the belt.

The pigment can be incorporated in the solution at the time the clear solution is made. For example, to make a blue solution which can be used either as a paint or to make self-sustaining films 3 percent by weight of a blue pigment such as Monestral blue, ground to a paste in a slurry of nylon and methanol can be added to a clear solution containing 10% nylon and 1% phenol at the conclusion of the usual boiling operation, and the boiling operation continued for three or four minutes to insure its thorough and uniform incorporation of the pigment in the solution. As stated above, self-sustaining films of exactly reproducible thickness, texture and appearance can be made by carefully regulating the composition and concentration of the solution, the quantity of solution per square foot of casting surface, the temperature maintained during the casting operation, and the rate of evaporation of the solvent. The concentration of the solution and the rate of evaporation of the solution are the major factors which determine the grain-like appearance of the surface which is exposed during the evaporation of the solvent. Generally speaking, the "grain" is deeper with increases in the solid content of the solution and also with increases in the rate of evaporation, and the texture and appearance of the cast film can be exactly reproduced by controlling all the above specified conditions within reasonable tolerances.

I claim:

1. In an apparatus for making plastic resinous solutions including a closed outer vessel; a liquid solvent container arranged within said vessel forming a double boiler, means for supplying solvent to said container; means for heating the vessel; a perforated basket adapted to hold an amount of resinous particles mounted in the upper section of the vessel and extending into the solvent container; a vertical reflux condenser supported above the vessel for condensing solvent vapor therein and discharging the condensate directly into the basket so that there is no loss of solvent; means for passing vapor accumulating within the container above the basket directly up into the lower end of the vertical condenser; means for agitating and providing intimate contact between the solvent and the resinous particles; and an air inlet passage having a water absorbent liquid seal means for removing moisture from the incoming air connected at the top of the condenser, said liquid seal means permitting flow of outside air to the condenser and preventing flow of fluid from the condenser.

2. The apparatus of claim 1 wherein the air inlet passageway is open to the atmosphere.

3. The apparatus of claim 2 wherein said moisture removing means includes two containers connected in series and in communication with the condenser, said containers carrying a quantity of solvent and water absorbent material, respectively.

References Cited

UNITED STATES PATENTS

| | | | |
|---|---|---|---|
| 1,463,154 | 7/1923 | Cammins | 202—167 X |
| 2,095,056 | 10/1937 | Clough | 202—168 X |
| 2,248,662 | 7/1941 | Edhofer et al. | 202—169 X |
| 2,308,416 | 1/1943 | Dreisbach | 206—32 |
| 2,329,712 | 9/1943 | Gillican | 202—168 |
| 2,330,655 | 9/1943 | Zucker | 202—168 X |
| 2,373,646 | 4/1945 | Binnington | 23—267 |
| 2,066,198 | 12/1936 | Buc | 23—272.6 |

FOREIGN PATENTS

| | | |
|---|---|---|
| 187,007 | 10/1922 | Great Britain. |
| 13,861 | 1886 | Great Britain. |
| 53,940 | 12/1917 | Sweden. |

NORMAN YUDKOFF, *Primary Examiner.*

F. E. DRUMMOND, *Assistant Examiner.*

U.S. Cl. X.R.

260—32; 23—272.6; 203—42